United States Patent
Augustin et al.

(10) Patent No.: US 12,084,747 B2
(45) Date of Patent: Sep. 10, 2024

(54) ALUMINUM-BASED ALLOY HAVING IMPROVED MECHANICAL STRENGTH IN AGEING AT HIGH TEMPERATURES AND ADAPTED TO RAPID SOLIDIFICATION

(71) Applicant: SAFRAN, Paris (FR)

(72) Inventors: Rémi Marie François Augustin, Moissy-Cramayel (FR); Edern Menou, Moissy-Cramayel (FR)

(73) Assignee: SAFRAN, Paris (FR)

( * ) Notice: Subject to any disclaimer, the term of this patent is extended or adjusted under 35 U.S.C. 154(b) by 476 days.

(21) Appl. No.: 17/611,760

(22) PCT Filed: Apr. 23, 2020

(86) PCT No.: PCT/FR2020/050697
§ 371 (c)(1),
(2) Date: Nov. 16, 2021

(87) PCT Pub. No.: WO2020/240105
PCT Pub. Date: Dec. 3, 2020

(65) Prior Publication Data
US 2022/0243307 A1    Aug. 4, 2022

(30) Foreign Application Priority Data
May 28, 2019    (FR) ...................................... 1905643

(51) Int. Cl.
| | | |
|---|---|---|
| C22C 21/00 | (2006.01) |
| B22F 5/00 | (2006.01) |
| B22F 10/28 | (2021.01) |
| B33Y 10/00 | (2015.01) |
| B33Y 70/00 | (2020.01) |
| B33Y 80/00 | (2015.01) |
| C22C 1/04 | (2023.01) |

(52) U.S. Cl.
CPC .............. *C22C 21/00* (2013.01); *B22F 5/009* (2013.01); *B22F 10/28* (2021.01); *B33Y 10/00* (2014.12); *B33Y 70/00* (2014.12); *B33Y 80/00* (2014.12); *C22C 1/0416* (2013.01); *C22C 21/003* (2013.01); *B22F 2301/052* (2013.01); *B22F 2301/205* (2013.01); *B22F 2301/35* (2013.01); *B22F 2998/10* (2013.01); *B22F 2999/00* (2013.01)

(58) Field of Classification Search
CPC .................................. C22C 21/00; C22F 1/04
See application file for complete search history.

(56) References Cited

U.S. PATENT DOCUMENTS

2018/0015545 A1    1/2018    Yang et al.
2018/0318922 A1    11/2018    Valls Anglés

FOREIGN PATENT DOCUMENTS

| CN | 108531781 A | 9/2018 |
| EP | 0 606 572 A1 | 7/1994 |
| EP | 0 821 072 A1 | 1/1998 |
| EP | 0 866 143 A1 | 9/1998 |
| WO | 2020/096662 A1 | 5/2020 |

OTHER PUBLICATIONS

International Search Report as issued in International Patent Application No. PCT/FR2020/050697, dated Oct. 13, 2020.
Choi, J. H., et al., "Consolidation behavior of nanocrystalline Al-5at. %Ti alloys synthesized by cryogenic milling," Journal of Alloys and Compounds, vol. 315, No. 1/02, Feb. 2001, pp. 178-186.

*Primary Examiner* — Jessee R Roe
(74) *Attorney, Agent, or Firm* — Pillsbury Winthrop Shaw Pittman LLP

(57) ABSTRACT

The invention relates to an aluminum alloy includes, in mass percentages 3 to 6% titanium, 1.5 to 3% manganese, 1 to 2% iron, 1 to 2% chromium, 0.5 to 1.5% vanadium, 0.5 to 1.5% nickel, 0.2 to 1% zirconium, 0 to 0.5% cerium, 0 to 0.5% lanthanum, the remainder being aluminum and unavoidable impurities.

15 Claims, 1 Drawing Sheet

[Fig. 1]
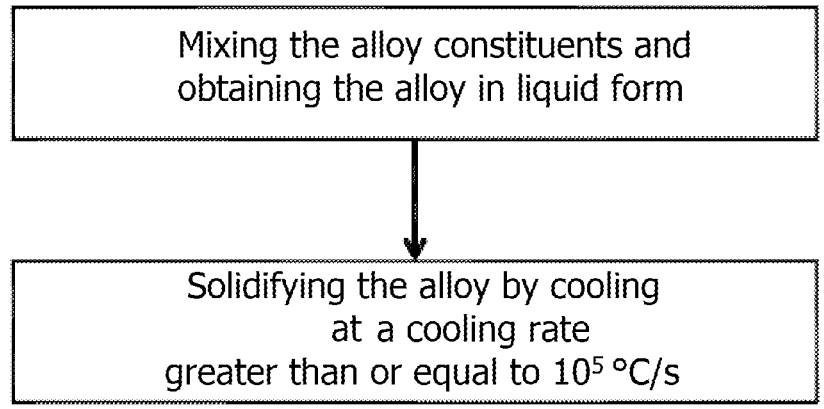
[Fig. 2]
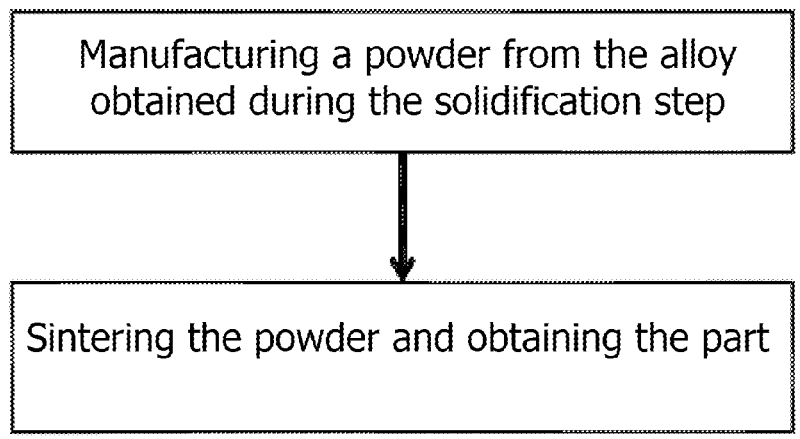
[Fig. 3]
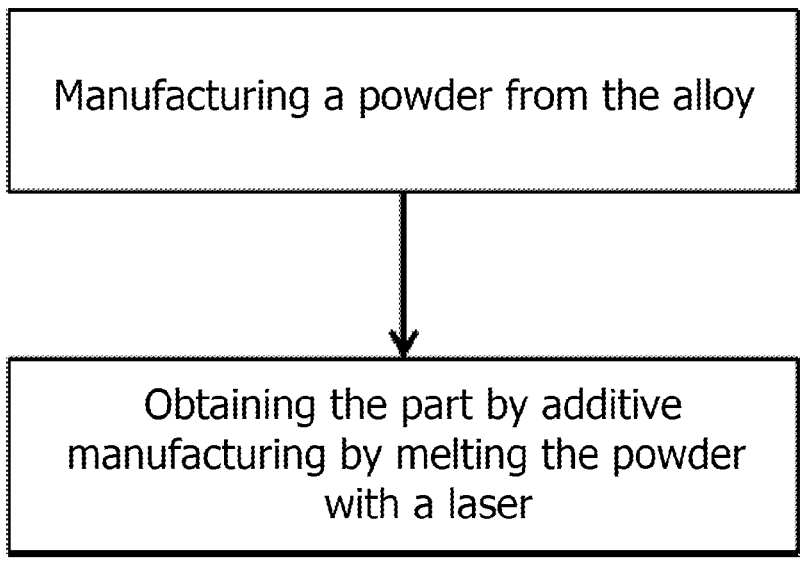

ALUMINUM-BASED ALLOY HAVING IMPROVED MECHANICAL STRENGTH IN AGEING AT HIGH TEMPERATURES AND ADAPTED TO RAPID SOLIDIFICATION

CROSS-REFERENCE TO RELATED APPLICATIONS

This application is the U.S. National Stage of PCT/FR2020/050697, filed Apr. 23, 2020, which in turn claims priority to French patent application number FR1905643 filed May 28, 2019. The content of these applications are incorporated herein by reference in their entireties.

TECHNICAL FIELD

The present invention relates to the general field of light alloys for turbomachines, and more particularly to aluminum alloys.

PRIOR ART

The aluminum-based light alloy equipment of turbomachines, and more particularly aircraft turbomachines, are subjected to increasingly high temperatures (typically between 200° C. and 300° C.) under mechanical fatigue stresses.

This is, for example, typically the case for oil pans, as the temperature of the oil tends to increase in the latest generations of turbomachines, or for outlet guide vanes (OGV).

Lifetime requirements for turbomachine equipment are increasing, particularly for aircraft turbomachines where lifetimes must exceed 90000 flight hours.

However, the aluminum alloys currently used do not provide high mechanical properties after aging at temperatures comprised between 200° C. and 300° C.

Indeed, at such temperatures, the known alloys generally undergo a sizeable reduction in their mechanical properties after 10000 hours of operation.

A reduction in the mechanical properties of aluminum alloys leads to oversizing of the parts in order to respect the constraint of equipment service life.

The reduction of the mechanical properties of current alloys is related to the instability of the microstructure of the alloy.

Such instability of the microstructure of the alloy is reflected in particular by the enlargement of the size of the precipitates obtained at the end of the heat treatments carried out to manufacture the material.

Indeed, in conventional aluminum alloys, precipitates, or phases, appear after the alloy has been dissolved, quenched and tempered.

These precipitates harden the alloy matrix as a function of the times and temperatures of the heat treatments carried out, the time and temperature directly influencing the size of these precipitates.

The known alloys have precipitates that grow too quickly during aging with a temperature comprised between 200° C. and 300° C., causing a reduction in the mechanical properties of these alloys.

DISCLOSURE OF THE INVENTION

The principle aim of the present invention is therefore to overcome such disadvantages by providing an aluminum alloy comprising, in mass percentages:

3 to 6% titanium,
1.5 to 3% manganese
1 to 2% iron,
1 to 2% chromium,
0.5 to 1.5% vanadium,
0.5 to 1.5% nickel,
0.2 to 1% zirconium,
0 to 0.5% cerium,
0 to 0.5% lanthanum,
the remainder consisting of aluminum and unavoidable impurities.

An aluminum alloy is defined as an alloy with a majority of aluminum by weight.

Unavoidable impurities are defined as those elements that are not intentionally added to the composition and are introduced with other elements. Among unavoidable impurities, particular mention may be made of silicon (Si) and carbon (C).

The alloy according to the invention has an improved fatigue strength at temperatures comprised between 200° C. and 300° C.

In particular, the alloy according to the invention has a grain size which is more stable by virtue of a grain-boundary blocking mechanism.

This grain-boundary blocking mechanism is in particular obtained by quasi-crystalline (QC) phases.

The alloy according to the invention is suitable for a manufacturing process with a very high solidification rate. In particular, this alloy makes it possible to generate quasi-crystalline (QC) phases during rapid solidification and allows elements to be brought into solid solution in the matrix, thereby strengthening the alloy.

This light aluminum alloy is used in the manufacture of turbomachine equipment such as oil pans or low-pressure outlet guide vanes (OGV).

This light aluminum alloy can also be used to manufacture structural parts for aircraft other than turbomachines parts, such as for example to manufacture landing gear components.

The alloy may comprise, in mass percentages, 4 to 6% titanium.

The alloy may comprise, in mass percentages, 2.1 to 2.6% manganese.

The alloy may comprise, in mass percentages, 1.3 to 1.7% chromium.

The alloy may comprise, in mass percentages, 1.2 to 1.6% iron.

The alloy may comprise, in mass percentages, 0.75 to 1.15% vanadium.

The alloy may comprise, in mass percentages, 0.8 to 1.1% nickel.

The alloy may comprise, in mass percentages, 0.45 to 0.75% zirconium.

The alloy may comprise, in mass percentages, 0.05 to 0.35% cerium.

The alloy may comprise, in mass percentages, 0 to 0.2% lanthanum.

The alloy may comprise, in mass percentages, 5.00% titanium, 2.34% manganese, 1.40% iron, 1.50% chromium, 0.95% vanadium, 0.95% nickel, 0.60% zirconium, 0.20% cerium, 0.10% lanthanum, the remainder consisting of aluminum and unavoidable impurities.

According to an additional aspect, the invention relates to a turbomachine part made of an aluminum alloy according to any one of the preceding features, said part preferably being a structural part of the turbomachine. A structural part is defined herein as a part that supports mechanical loads. The mechanical loads may be static loads, as is for example the case for those mechanical linkage parts of the turbomachine, such as for example the spacers of outlet guide vanes (OGV). The loads may also be dynamic forces, as may be the case, for example, for rotating elements of the turbomachine that must support centrifugal forces. The part can also be a non-structural part.

According to another aspect, the invention relates to a process for manufacturing a turbomachine part made of an aluminum alloy according to any one of the preceding features, comprising a step of solidifying the alloy in which the alloy passes from the liquid state to the solid state with a cooling rate greater than or equal to $10^{5\circ}$ C./s.

According to an additional feature, the part is made by additive manufacturing by laser melting a powder of the alloy.

According to a further feature, the process comprises the following steps:
making a powder from the alloy obtained after the solidification step;
sintering the powder thus produced to obtain the part.

BRIEF DESCRIPTION OF THE DRAWINGS

Other features and advantages of the present invention will emerge from the description provided below, with reference to the appended drawings which illustrate a non-limiting example embodiment thereof.

FIG. 1 schematically shows the steps of a process for manufacturing a turbomachine part according to the invention.

FIG. 2 schematically shows the steps of an alternative of the manufacturing process in which the part is obtained by sintering.

FIG. 3 schematically shows the steps of an alternative of the manufacturing process in which the part is obtained by additive manufacturing by melting an alloy powder with a laser.

DESCRIPTION OF THE EMBODIMENTS

The alloy according to the invention comprises a base of aluminum and titanium, with which are combined six transition metals, namely iron, chromium, vanadium, nickel, zirconium and manganese.

In addition, the alloy may comprise a rare-earth element such as cerium and/or lanthanum.

The alloy comprises 3-6% titanium, 1.5-3% manganese, 1-2% iron, 1-2% chromium, 0.5-1.5% vanadium, 0.5-1.5% nickel, 0.2-1% zirconium, 0-0.5% cerium, 0-0.5% lanthanum, the remainder consisting of aluminum and unavoidable impurities, such as for example silicon.

Such an alloy composition ensures better resistance to aging at temperatures comprised between 200° C. and 300° C.

Furthermore, such an alloy composition is suitable for manufacture with very rapid solidification. Very rapid solidification is defined herein as a transition from the liquid state to the solid state of the alloy with a cooling rate greater than or equal to $10^{5\circ}$ C./s. The composition of the alloy is indeed suitable for generating nanoscale quasi-crystalline (QC) phases during solidification of the alloy with a cooling rate greater than or equal to $10^{5\circ}$ C./s. These nanoscale quasi-crystalline (QC) phases can only occur during solidification at a cooling rate greater than or equal to $10^{5\circ}$ C./s. The rate of formation of the quasi-crystalline (QC) phases is directly related to the solidification rate, the QC phases being preserved by rapid quenching from the liquid state through the undercooling effect.

In addition, the composition of the alloy is suitable for providing solid solution in the matrix of elements, such as titanium, nickel and vanadium, thereby strengthening the alloy.

The alloy has an ultimate tensile strength (UTS) greater than or equal to 600 MPa at 20° C., and a reduction of mechanical properties inferior to that of conventional aluminum alloys at 250° C.

The stability of the mechanical properties of the alloy is achieved by stabilizing the grain size with a grain-boundary blocking mechanism, and by forming finer and more temperature stable dispersoid precipitates. Quasi-crystalline (QC) phases generated during solidification provide both functions, i.e., grain-boundary blocking and precipitate formation in the matrix.

The ratio, in atomic percent: Mn(%)/Fe(%) comprised between 1 and 1.7 promotes the generation of QC phases. When the ratio is close to 1, a eutectic Icosahedral phase is formed, whereas when the ratio is close to 1.7, an I-Phase or D-Phase is formed.

In addition, chromium stabilizes the QC phases. It also stabilizes the $Al_3Ti$ phases, thus improving the temperature aging performance.

Moreover, the combination of vanadium and zirconium stabilizes the icosahedral phases present in the alloy, thereby improving the temperature aging performance.

In addition, cerium and lanthanum allow a modification and refinement of the phases appearing during the melting of the alloy, promoting a fine and dispersed precipitation during rapid solidification. Lanthanum allows the modification of the Al(Fe, Ni) intermetallic phases to refine the structure and lead to an optimal dispersion of the precipitates during solidification. Cerium promotes the formation of QC phases. Lanthanum and cerium can be added to the alloy by adding misch metal, or they can be added independently.

Advantageously, the alloy may comprise, in mass percentages, 4-6% titanium, 1.5-3% manganese, 1-2% iron, 1-2% chromium, 0.5-1.5% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 3-6% titanium, 2.1-2.6% manganese, 1-2% iron, 1-2% chromium, 0.5-1.5% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.5-1.5% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 3 to 6% titanium, 1.5 to 3% manganese, 1 to 2% iron, 1.3 to 1.7% chromium, 0.5 to 1.5% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 4 to 6% titanium, 1.5 to 3% manganese, 1 to 2% iron, 1.3 to 1.7% chromium, 0.5 to 1.5% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 4-6% titanium, 2.1-2.6% manganese, 1-2% iron, 1.3-1.7% chromium, 0.5-1.5% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 3 to 6% titanium, 1.5 to 3% manganese, 1.2 to 1.6% iron, 1 to 2% chromium, 0.5 to 1.5% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 4 to 6% titanium, 1.5 to 3% manganese, 1.2 to 1.6% iron, 1 to 2% chromium, 0.5 to 1.5% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.5-1.5% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.5 to 1.5% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 3-6% titanium, 1.5-3% manganese, 1-2% iron, 1-2% chromium, 0.75-1.15% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 1.5-3% manganese, 1-2% iron, 1-2% chromium, 0.75-1.15% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.75-1.15% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.75-1.15% vanadium, 0.5-1.5% nickel, 0.2-1% zirconium, 0-0.5% cerium, 0-0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.5 to 1.5% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 3-6% titanium, 1.5-3% manganese, 1-2% iron, 1-2% chromium, 0.5-1.5% vanadium, 0.8-1.1% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 1.5-3% manganese, 1-2% iron, 1-2% chromium, 0.5-1.5% vanadium, 0.8-1.1% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.5-1.5% vanadium, 0.8-1.1% nickel, 0.2-1% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.5-1.5% vanadium, 0.8-1.1% nickel, 0.2-1% zirconium, 0-0.5% cerium, 0-0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.5 to 1.5% vanadium, 0.8 to 1.1% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.2 to 1% zirconium, 0 to 0.5% cerium, 0 to 0.5% lanthanum, with the remainder consisting of aluminum and unavoidable impurities.

Advantageously, the alloy may comprise, in mass percentages, 3 to 6% titanium, 1.5 to 3% manganese, 1 to 2% iron, 1 to 2% chromium, 0.5 to 1.5% vanadium, 0.5 to 1.5% nickel, 0.45 to 0.75% zirconium, 0 to 0.5% cerium, 0 to 0.5% lanthanum, with the remainder consisting of aluminum and unavoidable impurities.

Advantageously, the alloy may comprise, in mass percentages, 4-6% titanium, 1.5-3% manganese, 1-2% iron, 1-2% chromium, 0.5-1.5% vanadium, 0.5-1.5% nickel, 0.45-0.75% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.5-1.5% vanadium, 0.5-1.5% nickel, 0.45-0.75% zirconium, 0-0.5% cerium, 0-0.5% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.5-1.5% vanadium, 0.5-1.5% nickel, 0.45-0.75% zirconium, 0-0.5% cerium, 0-0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.5 to 1.5% vanadium, 0.5 to 1.5% nickel, 0.45 to 0.75% zirconium, 0 to 0.5% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.5 to 1.5% nickel, 0.45 to 0.75% zirconium, 0 to 0.5% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.45 to 0.75% zirconium, 0 to 0.5% cerium, 0 to 0.5% lanthanum, with the remainder consisting of aluminum and unavoidable impurities.

Advantageously, the alloy may comprise, in mass percentages, 3 to 6% titanium, 1.5 to 3% manganese, 1 to 2% iron, 1 to 2% chromium, 0.5 to 1.5% vanadium, 0.5 to 1.5% nickel, 0.2 to 1% zirconium, 0.05 to 0.35% cerium, 0 to 0.5% lanthanum, with the remainder consisting of aluminum and unavoidable impurities.

Advantageously, the alloy may comprise, in mass percentages, 4 to 6% titanium, 1.5 to 3% manganese, 1 to 2% iron, 1 to 2% chromium, 0.5 to 1.5% vanadium, 0.5 to 1.5% nickel, 0.2 to 1% zirconium, 0.05 to 0.35% cerium, 0 to 0.5% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.5-1.5% vanadium, 0.5-1.5% nickel, 0.2-1% zirconium, 0.05-0.35% cerium, 0-0.5% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.5-1.5% vanadium, 0.5-1.5% nickel, 0.2-1% zirconium, 0.05-0.35% cerium, 0-0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.5 to 1.5% vanadium, 0.5 to 1.5% nickel, 0.2 to 1% zirconium, 0.05 to 0.35% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.5 to 1.5% nickel, 0.2 to 1% zirconium, 0.05 to 0.35% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.2 to 1% zirconium, 0.05 to 0.35% cerium, 0 to 0.5% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.45 to 0.75% zirconium, 0.05 to 0.35% cerium, 0 to 0.5% lanthanum, with the remainder consisting of aluminum and unavoidable impurities.

Advantageously, the alloy may comprise, in mass percentages, 3-6% titanium, 1.5-3% manganese, 1-2% iron, 1-2% chromium, 0.5-1.5% vanadium, 0.5-1.5% nickel, 0.2-1% zirconium, 0-0.5% cerium, 0-0.2% lanthanum, with the remainder consisting of aluminum and unavoidable impurities.

Advantageously, the alloy may comprise, in mass percentages, 4-6% titanium, 1.5-3% manganese, 1-2% iron, 1-2% chromium, 0.5-1.5% vanadium, 0.5-1.5% nickel, 0.2-1% zirconium, 0-0.5% cerium, 0-0.2% lanthanum, with the remainder consisting of aluminum and unavoidable impurities.

Advantageously, the alloy may comprise, in mass percentages, 4-6% titanium, 2.1-2.6% manganese, 1-2% iron, 1-2% chromium, 0.5-1.5% vanadium, 0.5-1.5% nickel, 0.2-1% zirconium, 0-0.5% cerium, 0-0.2% lanthanum, with the remainder consisting of aluminum and unavoidable impurities.

Advantageously, the alloy may comprise, in mass percentages, 4-6% titanium, 2.1-2.6% manganese, 1.2-1.6% iron, 1-2% chromium, 0.5-1.5% vanadium, 0.5-1.5% nickel, 0.2-1% zirconium, 0-0.5% cerium, 0-0.2% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.5 to 1.5% vanadium, 0.5 to 1.5% nickel, 0.2 to 1% zirconium, 0 to 0.5% cerium, 0 to 0.2% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.5 to 1.5% nickel, 0.2 to 1% zirconium, 0 to 0.5% cerium, 0 to 0.2% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.2 to 1% zirconium, 0 to 0.5% cerium, 0 to 0.2% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.45 to 0.75% zirconium, 0 to 0.5% cerium, 0 to 0.2% lanthanum, with the remainder consisting of aluminum and unavoidable impurities.

Advantageously, the alloy may comprise, in mass percentages, 4 to 6% titanium, 2.1 to 2.6% manganese, 1.2 to 1.6% iron, 1.3 to 1.7% chromium, 0.75 to 1.15% vanadium, 0.8 to 1.1% nickel, 0.45 to 0.75% zirconium, 0.05 to 0.35% cerium, 0 to 0.2% lanthanum, with the remainder consisting of aluminum and unavoidable impurities.

According to an advantageous alternative, the alloy comprises, in mass percentages, 5.00% titanium, 2.34% manganese, 1.40% iron, 1.50% chromium, 0.95% vanadium, 0.95% nickel, 0.60% zirconium, 0.20% cerium, 0.10% lanthanum, the remainder consisting of aluminum and unavoidable impurities.

Thus, as illustrated in FIG. 1, the process for manufacturing an alloy part comprises the following steps:

Mixing the alloy constituents and obtaining the alloy in liquid form. In this step, the various constituents of the alloy, aluminum, titanium, manganese, iron, chromium, vanadium, nickel, zirconium, cerium and lanthanum, are mixed in liquid phase. Such a mixture makes it possible to obtain the alloy, said alloy still being in the liquid phase.

Solidifying the alloy by cooling at a cooling rate greater than or equal to $10^{5°}$ C./s. Indeed, a cooling rate greater than $10^{5°}$ C./s makes it possible to obtain the desired precipitates, i.e., of small size and stable over time when exposed to a temperature comprised between 200° C. and 300° C. The cooling of the alloy for its solidification can for example be carried out by melt spinning, by atomization in the form of fine droplets cooled under neutral gas, or by any other process allowing to obtain such a cooling speed. Once solidified, the alloy can be ground to form a powder with grains of the desired diameter.

After the solidification step, the alloy has the properties of resistance to mechanical stresses when exposed to temperature, so it is not necessary to perform heat treatment once the alloy has solidified. However, a heat treatment can be performed, especially during the shaping of the alloy part.

Once solidified, the alloy can be shaped in several ways.

For example, as illustrated in FIG. 2, the manufacturing process may comprise the following steps:

Manufacturing a powder from the alloy obtained during the solidification step.

Sintering the powder and obtaining the part. To this end, the powder is placed in a mold to give it the shape of the part to be manufactured and is compacted. The compaction can be carried out hot or cold, and under vacuum or controlled atmosphere. Finally, if the compaction has been carried out cold, the powder in the mold is heated in order to diffuse the powder of the alloy and give its coherence to the part. The sintering can also be spark plasma sintering (SPS).

However, other manufacturing methods are possible. For example, the part can be formed by forging, cold rolling or hot rolling, by extrusion, or by superplastic forming (SPF).

Furthermore, the alloy part according to the invention can be made by additive manufacturing, or three-dimensional (3D) printing, in which alloy powder is melted by a laser. Indeed, the Applicant has found that the solidification of the drop of alloy melted by the laser gives the alloy its temperature aging properties.

FIG. 3 illustrates the alternative in which the part is manufactured by additive manufacturing in which the alloy powder is melted by laser beam melting (LBM). The alloy powder used for additive manufacturing can for example be produced by atomization.

The substrate on which the part is manufactured, as well as the portion of the part already manufactured, allow for very rapid heat absorption due to the small amount of alloy melted with the laser. The drop of alloy melted with the laser solidifies at a cooling rate greater than or equal to $10^{5}$° C./s.

Thus, when the part is manufactured by additive manufacturing, it is not necessary for the alloy powder used to have already been solidified with a cooling rate greater than or equal to $10^{5}$° C./s, which simplifies the manufacture of the powder used for additive manufacturing. The use of additive manufacturing with this alloy thus brings a dual advantage, on the one hand parts with a very complex shape can be manufactured, and on the other hand the manufacturing process is simplified because the solidification step is carried out by manufacturing the part with the laser.

The invention claimed is:

1. An aluminum alloy comprising, in mass percentages:
3 to 6% titanium,
1.5 to 3% manganese
1 to 2% iron,
1 to 2% chromium,
0.5 to 1.5% vanadium,
0.5 to 1.5% nickel,
0.2 to 1% zirconium,
0 to 0.5% cerium,
0 to 0.5% lanthanum,
the remainder consisting of aluminum and unavoidable impurities.

2. The alloy as claimed in claim 1 comprising, in mass percentages, 4 to 6% titanium.

3. The alloy as claimed in claim 1 comprising, in mass percentages, 2.1 to 2.6% manganese.

4. The alloy as claimed in claim 1 comprising, in mass percentages, 1.3 to 1.7% chromium.

5. The alloy as claimed in claim 1 comprising, in mass percentages, 1.2 to 1.6% iron.

6. The alloy as claimed in claim 1 comprising, in mass percentages, 0.75 to 1.15% vanadium.

7. The alloy as claimed in claim 1 comprising, in mass percentages, 0.8 to 1.1% nickel.

8. The alloy as claimed in claim 1 comprising, in mass percentages, 0.45 to 0.75% zirconium.

9. The alloy as claimed in claim 1 comprising, in mass percentages, 0.05 to 0.35% cerium.

10. The alloy as claimed in claim 1 comprising, in mass percentages, 0 to 0.2% lanthanum.

11. The alloy as claimed in claim 1, comprising, in mass percentages:
5.00% titanium,
2.34% manganese,
1.40% iron,
1.50% chromium,
0.95% vanadium,
0.95% nickel,
0.60% zirconium,
0.20% cerium,
0.10% lanthanum,
the remainder consisting of aluminum and unavoidable impurities.

12. A turbomachine part made of an aluminum alloy as claimed in claim 1.

13. A process for manufacturing a turbomachine part made of an aluminum alloy as claimed in claim 1, comprising a step of solidifying the alloy in which the alloy passes from the liquid state to the solid state with a cooling rate greater than or equal to 105° C./s.

14. The process as claimed in claim 13, wherein the part is made by additive manufacturing by laser melting a powder of the alloy.

15. The process as claimed in claim 13, comprising the following steps:
manufacturing a powder from the alloy obtained in the solidification step;
sintering the powder thus produced to obtain the part.

* * * * *